July 15, 1958 A. RICH 2,843,420
AUTOMATIC PROTECTIVE WINDSHIELD PAD
Filed Jan. 17, 1956
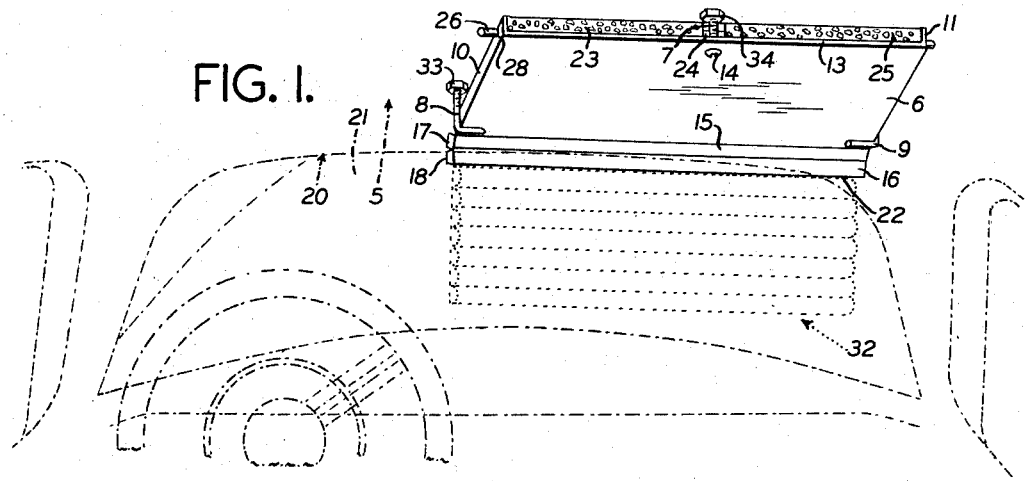
FIG. 1.
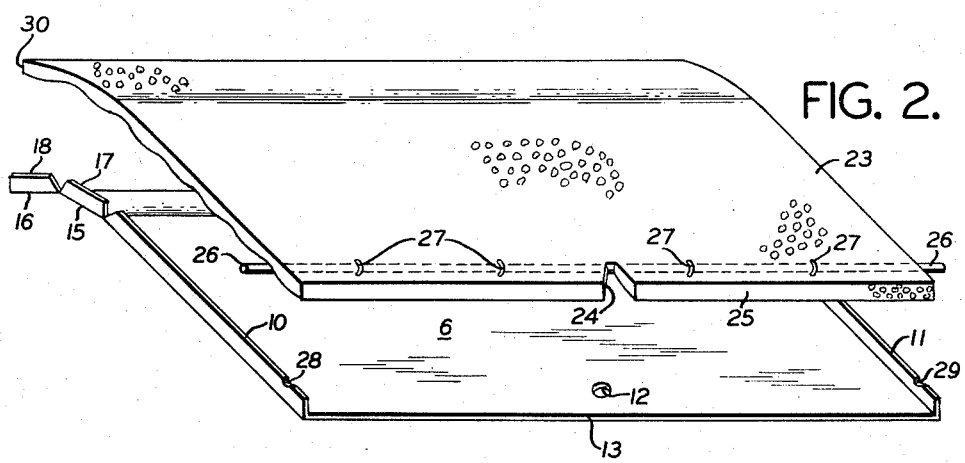
FIG. 2.
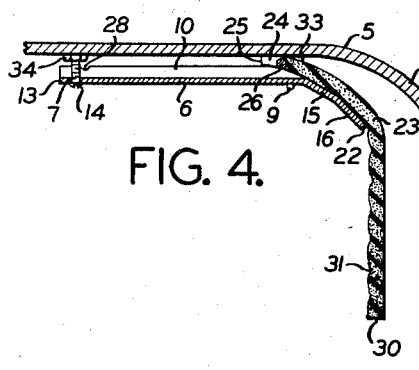
FIG. 4. FIG. 3.
INVENTOR
ARTHUR RICH.
BY
ATTORNEYS.

United States Patent Office 2,843,420
Patented July 15, 1958

2,843,420

AUTOMATIC PROTECTIVE WINDSHIELD PAD

Arthur Rich, Flushing, N. Y.

Application January 17, 1956, Serial No. 559,644

2 Claims. (Cl. 296—84)

This invention relates to protective devices, cushions and pads, and particularly to an automatic protective windshield pad and the like.

The main object of my invention is to provide an automobile with an automatically operated protective means for shielding a front seat passenger and even a driver from direct contact with the windshield in case of crash or collision accident by introducing upon impact the protective means between the windshield and the passenger.

An ancillary object of my invention is to have a movable protective pad mounted upon the front of an automobile normally in raised idle position, but responsive to impact of the car with any object and then effective to drop into cushioning position within the windshield in such manner as to soften the impact of the front seat passenger with the windshield and thereby prevent serious injury.

Another object of this invention is to mount an operative mechanism upon the automobile in effective position to support the pad in raised idle position in normal conditions, and of such nature and construction as to release the pad and allow it to drop into useful position before the passenger who sits behind the windshield when the car strikes any object with force.

It is also an object of the invention to have a protective pad for the indicated purpose which is made of expanded or foam rubber or of any other suitable porous and elastic material, which is capable of eliminating the violent blow or shock of impact with the windshield suffered by a passenger suddenly pitched forward upon occurrence of a crash or collision between the car and some other object.

A specific object is to provide an automobile with a special holding mechanism upon the upper front portion thereof for supporting a protective cushion or pad in raised position above the windshield directly above the effective protecting position of the pad at the windshield level, which pad becomes automatically released so as to drop into its effective protecting position when the car strikes another car or massive object such as a tree, bank or rock, etc.

It is, of course, an object with a definite view to economy to so construct such a protective windshield pad that it will be certain to operate promptly and effectively, will be simple to install, unobtrusive, and also reasonable in cost in order to encourage general adoption by automobile owners and drivers everywhere.

Other objects and advantages of my invention will appear in greater detail as the specification proceeds.

In order to facilitate ready comprehension of this invention for a proper appreciation of the salient features thereof, the invention is illustrated on the accompanying drawing forming part hereof, and in which:

Figure 1 is a fragmentary phantom view of the front and windshield section of an automobile, looking forward from within the car which is equipped with the protective windshield pad made according to my invention and embodying the same in a practical form;

Figure 2 is a perspective view of the protective pad and its supporting means in exploded relation and seen from the rear looking downwardly on the pad;

Figure 3 is a vertical front to rear section of the same protective pad and supporting means as well as part of the front portion of the roof of the automobile equipped with the invention, the pad being shown in normal inactive position, ready to operate upon the car encountering another car or formidable object in an accident; and Figure 4 is another similar section of the same device shown after operation caused by an accident.

In these views, the same reference numerals indicate the same or like parts and features.

Accidents upon the highways and streets of the nation are of all too frequent occurrence, with frequent tragic results. Most serious results of such accidents arise from one or more passengers being pitched headlong against the windshield of the car involved, far too often so violently and sharply that serious injury and even death is suffered. Such results are usually caused by the passenger having his head directly striking the windshield with the full force of his momentum, with nothing to shield his head.

Inasmuch as accidents appear to be unavoidable at times, this situation is serious and calls for a remedy of some kind. In view of this problem, I propose to equip an automobile with a special protective crash pad or cushion that is normally retained unobtrusively in a raised idle position, from which it can automatically be projected down before the windshield in time to cushion contact of the passenger's head with the windshield when an accident strikes, as will now be set forth in detail in the following, due reference being had to the drawing.

Hence, in the practice of my invention, beneath the front portion of the roof 5 of an automobile is suspended a supporting tray 6 by means of a depending bolt 7 and two depending hooks 8 and 9 at the two side edges or flanges 10 and 11 of the tray. The first bolt 7 extends through a center hole 12 within the rear edge 13 of this tray 6 so that the latter is suspended on the head 14 of the bolt. The lower hooked ends of hook members 8 and 9 are turned inwardly beneath the tray adjacent to the forward portion thereof, while the flanges 10 and 11 are bent upwardly for a purpose that will be explained.

Forwardly of the portion of the tray or carrier supported by these hooks 8 and 9, the tray is continued forwardly and downwardly in inclined manner, forming two successively inclined guide portions 15 and 16 having side flanges 17 and 18 (one side shown), these inclined guide portions roughly following the general shape of the outer curved front 19 of the car roof 5 which connects at its lower termination 20 with windshield 21, at a slightly lower level than the lower edge 22 of guide portion 16.

Upon the tray or carrier 6 is slidably located a wide, flexible pad 23 preferably made of foam rubber or expanded rubber or other elastic plastic material, whether synthetic or of natural origin, being substantially the full width of the tray 6 and retained and guided between flanges 10 and 11 as well as 17 and 18 at both ends of guide portions 15 and 16. Normally, in idle position, this pad, as shown in Figures 1 and 3 is substantially coextensive with, and lies upon tray 6 with its inclined extensions 15 and 16, having a V-cut centering cutout 24 (Figure 2) forming a clearance for center bolt 7.

Adjacent to the rear edge 25 of pad 23 is secured a transverse stop rod 26 by means of a series of wire or fabric rings or stitches 27, 27, etc., extending a short distance beyond the side edges of the pad in order normally to seat in a pair of opposite notches 28, 29 when this rod occupies its rearward position as shown in Figures 1 and 3. The rod has its ends normally seated by gravity, but may be displaced forwardly by any force on the pad at its front end 30, as, for example, by its own momentum, if the car is brought to a sudden stop by crashing into another or into a tree or rock. Such movement of the pad will cause the ends of rod 26 to jump out of notches 28, 29 in tray flanges 10 and 11 and will project the pad itself forward along the tray and the leading edge thereof down along inclined guide portions 15 and 16 until the ends of rod 26 strike the side hook members 8 and 9. These hooks form limiting stops for the rear end of the pad by stopping the rod and preventing the entire pad from sliding down off the tray 6, and determine a final extreme dropped position for the pad in which the depending end 31 (Figure 4) hangs down within windshield 21 a sufficient distance to form an effective cushioning baffle or obstructing pad directly in the path of the head of a front seat passenger in the car equipped with this invention, as also indicated at 32 in Figure 1 in phantom lines.

It is intended that the pad will slide so smoothly down along the front end of the tray that its movement will be swift enough to drop the pad in time to be in effective shielding position before the passenger by the same stoppage of the car will be pitched forward toward the windshield. The pad is movable along the tray 6 from its rear idle position wherein stop rod 26 rests in flange notches 28, 29, to a projected active protective position wherein the same stop rod rests against hooks 8 and 9 which also support the forward portion of the tray at the sides of the latter. When the accident is past, the pad may be restored by hand to original normal idle position in which rod 26 rests again in the flange notches 28, 29 and the leading edge 30 of the pad terminates substantially in register with the edge 22 of inclined guide portion 16 of the tray 6.

If desired, the leading edge 30 of the pad may be ballasted by a rod or by weights secured thereto in order to accelerate dropping of the pad into effective position before the windshield, and the pad itself may be made heavier and thicker and in successive sections connected by thinner connective sections to facilitate bending and sliding of the pad as it rides down over the inclined guide portions 15 and 16 into final active position.

The bolts 7 and hooks 8 and 9 are screwed into the nuts 33, 33 and 34 mounted on the roof of the car. These nuts may be welded to the roof of the car or may be made of highly magnetic metal or alloy and magnetized so as to adhere magnetically to the roof 5. These modifications are well within the purview of my invention and my invention operates in the same manner and according to the same principles whatever the manner of attaching the hooks and bolt to the roof may be.

From the foregoing, it is evident that when an automobile provided with the invention gets into a crash or collision accident, the slidable protective crash pad, as it may be termed instantly is projected into effective cushioning position in front of the first seat passenger in the car thus equipped and prevents serious injury from being inflicted upon him by direct contact with the windshield. The pad extends across at least the one side occupied by such passenger, and preferably a little past the middle of the windshield, but it may, of course also extend the entire distance across the windshield when desired. In any event, the operation of the crash pad is automatic, caused by momentum of the pad itself, and immediate when the accident occurs, but under normal conditions and when the car is but mildly jarred in the course of regular driving, the pad will remain in place, ready for action when actually dislodged and projected into shielding position by a shock to the car sufficiently violent thus to dislodge said pad.

Other variations and modifications than those indicated may, of course, be adopted, within the scope and spirit of my invention while employing the operative principles enunciated in the foregoing description.

Having now fully described my invention, I claim:

1. An automatic protective device including a cushioning pad adapted to be disposed relative to a windshield for protecting an occupant of a vehicle when said pad is in active protecting position, stationary mounting means secured within said vehicle for supporting the pad in said active protecting position and also in normal raised position in which the windshield is clear and unobstructed by said pad, said pad consisting of a flexible thickness of resilient material, said stationary mounting means including a tray mounted beneath the roof of said vehicle and terminating in a forwardly extending pad guide portion inclined downwardly toward the windshield, upwardly extending side flanges on said tray including the forwardly extending pad guide portion to guide the pad in sliding movement along the tray toward the windshield, supporting means for said tray including fastening means for securing the tray to the vehicle roof and a pair of side hooks one on each side of the tray at the forward portion thereof and extending beneath the tray, pad retaining means adapted to retain said pad in its raised position during normal automobile travel and to release said pad in response to a rapid deceleration of the vehicle, said pad retaining means including a transverse stop rod secured to the rear portion of the pad and having portions projecting beyond the lateral edges of said pad, said projecting rod portions engaging said pair of tray side hooks to retain said pad in its active protecting position.

2. An automatc protective device including a cushioning pad according to claim 1, wherein the side flanges of the supporting tray for the pad have seating notches adjacent their rear ends to seat the ends of the stop rod.

References Cited in the file of this patent

UNITED STATES PATENTS

| | | |
|---|---|---|
| 2,180,912 | Rogers | Nov. 21, 1939 |
| 2,444,524 | Parrish | July 6, 1948 |
| 2,592,573 | Joncas | Apr. 15, 1952 |